Sept. 8, 1931.  F. O. KOEPP  1,822,041
STARTING ATTACHMENT FOR MOTOR VEHICLES
Filed July 16, 1929    2 Sheets-Sheet 1
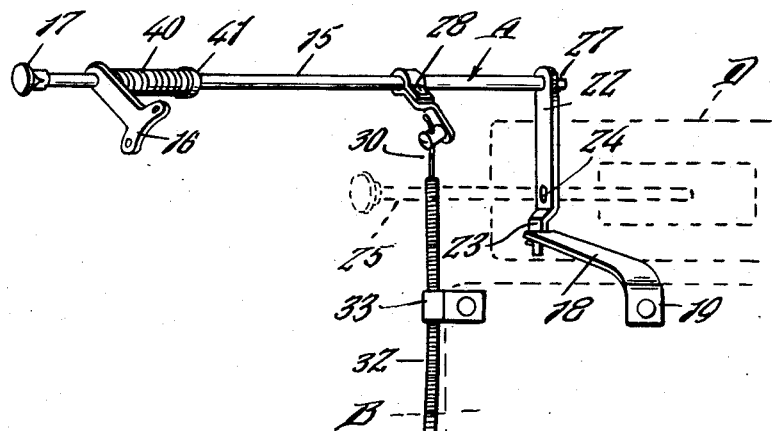
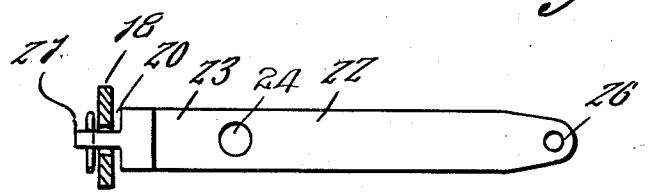

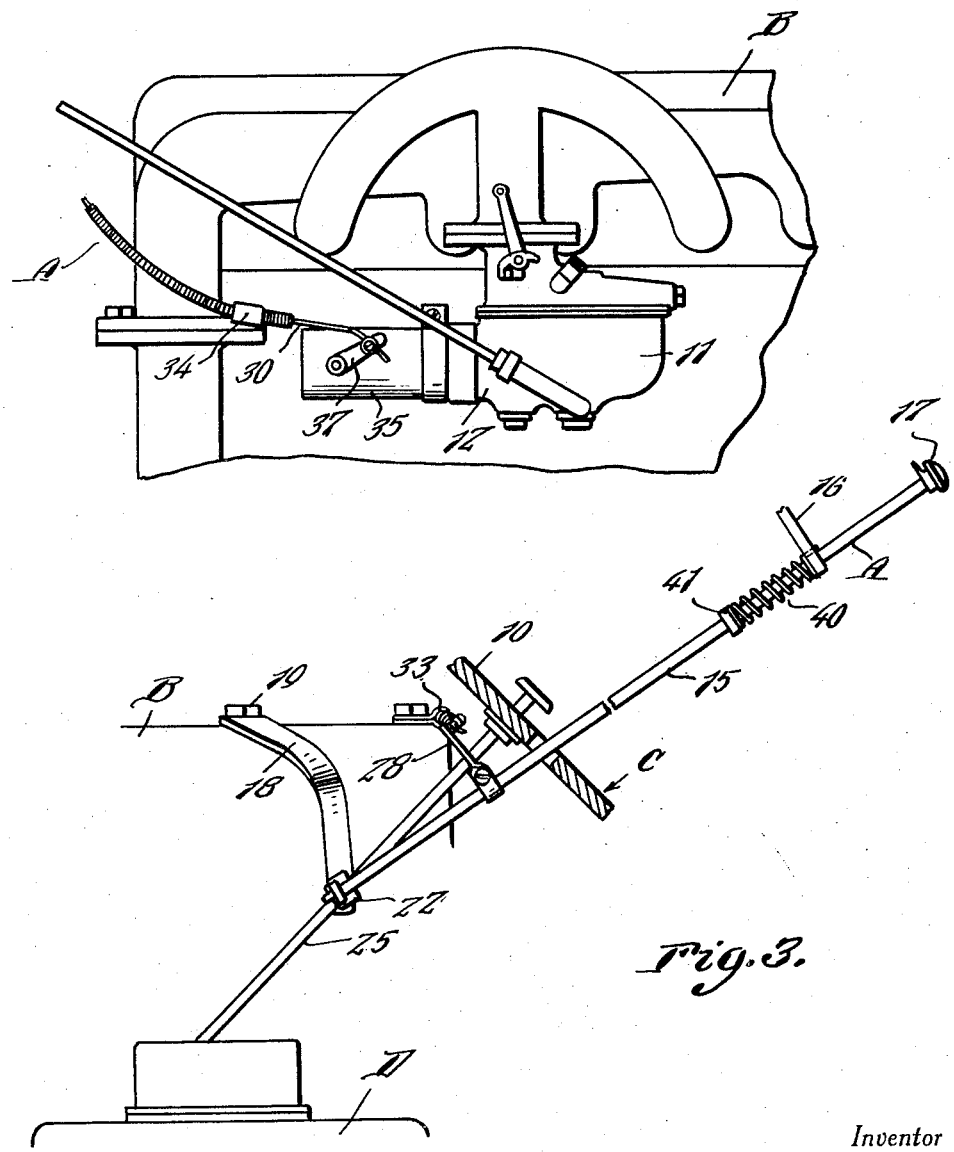

Patented Sept. 8, 1931

1,822,041

UNITED STATES PATENT OFFICE

FRIDO O. KOEPP, OF LA VERNIA, TEXAS

STARTING ATTACHMENT FOR MOTOR VEHICLES

Application filed July 16, 1929. Serial No. 378,701.

This invention appertains to attachments for automobiles and more particularly to a novel device for facilitating the starting of the internal combustion engine thereof.

One of the primary objects of my invention is to provide a novel device which can be readily incorporated with a conventional automobile without change in any existing parts thereof for actuating the engine starter and synchronous therewith choking the air supply to the carbureter.

Another important object of my invention is the provision of a single operating rod arranged adjacent to the steering wheel of an automobile and in convenient reach of the hand of the driver of the automobile for actuating the starter button of the automobile and for choking the carbureter.

A further object of my invention is the provision of novel means for mounting the various parts of the device on the vehicle and the provision of an auxiliary air choke connected with the carbureter, which can be readily manipulated from the starter rod forming a part of my invention.

A still further object of my invention is to provide a novel device for facilitating the starting of an engine of an automobile of the above character which will be durable and efficient in use, one that will be simple and easy to manufacture, and one which can be placed upon the market and incorporated with an automobile at a low cost.

With these and other objects in view, the invention consists in the novel construction, arrangement and formation of parts, as will be hereinafter more specifically described, claimed, and illustrated in the accompanying drawings, in which drawings:

Figure 1 is a top plan view of my improved attachment showing the same applied to the engine and starter, the engine, starter and associate parts being shown in dotted lines, Figure 2 is a side elevation showing a part of my device incorporated with the engine.

Figure 3 is a fragmentary longitudinal section through an automobile looking from the opposite sides of Figure 2 showing the various parts of my device in operative position, Figure 4 is an end elevational view of a choke attachment for air inlet of the engine carbureter, Figure 5 is a detail sectional view showing the operating lever for the starter button and the means for connecting the same to its support, Figure 6 is a detail sectional view illustrating the means for connecting the flexible wire for operating the choker attachment to the starter operating rod.

Figure 7 is a fragmentary detail view, partly in section, and partly in elevation, illustrative of certain details of construction to be hereinafter more fully referred to.

Referring to the drawings in detail, wherein similar reference characters designate corresponding parts throughout the several views, the letter A generally indicates my improved attachment for facilitating the starting of an engine B of an automobile C. An electric starter of any conventional type, indicated by the reference character D is provided for starting the engine B.

The automobile C includes the conventional foot board 10 forming a part of the body of the automobile. The engine B is also of the conventional character and is provided with any preferred type of carbureter 11 having the usual main air inlet 12, with which a part of my attachment is adapted to be associated.

My improved attachment A comprises a starter operating rod 15 which is slidably supported by brackets 16, which may be bolted or otherwise secured under the instrument or dash board of a vehicle or to the steering shaft bracket. The upper end of the rod preferably terminates adjacent to the steering wheel whereby the same can be conveniently reached by the driver of the vehicle and this end of the rod is provided with a manipulating button or thumb piece 17.

The bracket 16 allows the rod to be both turned and slid therein. Adjacent to the inner end of the rod I provide a supporting bracket 18 which may be made from strap iron and this bracket is connected to the engine by one of the cylinder head bolts 19.

This bracket 18 extends downwardly and rearwardly toward the starter D, as can be clearly seen by referring to Figure 3 of the drawings. The lower end of the bracket 18 is provided with an opening 20 which rockably receives the reduced terminal 21 of the starter operating lever 22.

As shown the starter lever 22 is offset at a point intermediate its ends as at 23 and is provided adjacent to said offset portion with an opening 24 for the reception of the conventional starter rod 25. The starter rod 25, beneath the starting lever 22, has projecting therethrough a pin 25′, against which the lever 22 is adapted to abut, upon rocking of the lever 22, for moving the starter rod 25 downwardly, for operating the starter mechanism in the manner to be hereinafter more fully referred to.

The outer end of the lever 22 is provided with an opening 26 for the reduced terminal 27 of starter and choke operating rod 15. This rod 15 has clamped thereto at a point intermediate its ends the rearwardly extending choke operating arm 28. The outer end of the arm 28 is provided with a stud 29 which stud is adapted to receive a flexible pull cable 30.

The cable can be held on the stud by the use of a suitable screw or the like 31. The casing 32 for the cable is supported by a pair of clamps 33 and 34 which can be held in place respectively by one of the cylinder head bolts and by one of the exhaust manifold bolts.

The opposite end of the cable terminates adjacent to the main air inlet 12 of the carbureter 11. Connected with the carburetor 11 is my choke attachment 35 which is in the nature of an open cylinder, which is connected directly with said main air inlet 12.

This cylinder or sleeve 35 has rockably mounted therein a butterfly valve 36 to which is connected a crank arm 37. The crank arm 37 has in turn connected therewith the forward end of the flexible cable 30, by the use of a suitable stud screw or the like.

In operation of my improved device it is merely necessary to rotate the rod 15 which will rock the arm 28 and at the same time a pull will be exerted on the cable 30.

Pushing down on rod 15 will rock the lever 22 for engagement with pin 25′ will operate the starter button rod 25 and the cable will close the butterfly valve 36. Thus by the operation of a single rod, placed within convenient reach of the hand of the driver of the automobile the air to the carbureter can be controlled and the circuit closed to the electric starter.

In order to prevent the rod 15 from rattling and to hold the same in one position I provide a coil spring 40 which is placed around the rod 16 and which can bear against supporting brackets 16 at one end and against a collar 41 secured to the rod at its opposite end.

Changes in details may be made without departing from the spirit or scope of this invention, but

Having thus described my invention, what I claim as new is:

1. In combination with an internal combustion engine of an automobile having a carbureter provided with an air inlet and valve for controlling the same, an electric starter for the engine having a starter button rod, of a single manually operated rod for actuating the valve and starter button rod, and means operatively connecting said manually operated rod to said starter button rod, whereby said starter button rod may be operated independently of said manually operated rod for operating the electric starter.

2. The combination with the internal combustion engine of an automobile including a carbureter having an air inlet and an electric starting motor therefor having a starter button rod, of means for facilitating the starting of the engine including a bracket connected to one of the cylinder bolts, a lever rockably connected to the bracket having an opening for receiving the starter button rod, a pin on said starter button rod engageable by said lever, upon racking of the lever an operating rod operatively connected to the lever and terminating adjacent to the steering wheel, a flexible cable connected with the operating rod, a cylinder having a butterfly valve connected to the air inlet of the carbureter and means connecting the flexible cable to said throttle valve, and means for supporting the cable.

In testimony whereof I affix my signature.

FRIDO O. KOEPP.